July 29, 1952 K. R. THOMPSON 2,604,737
ROD FEEDING MECHANISM
Filed May 4, 1949 2 SHEETS—SHEET 1

INVENTOR.
Keith R. Thompson
BY
Harness, Dickey & Pierce
ATTORNEYS.

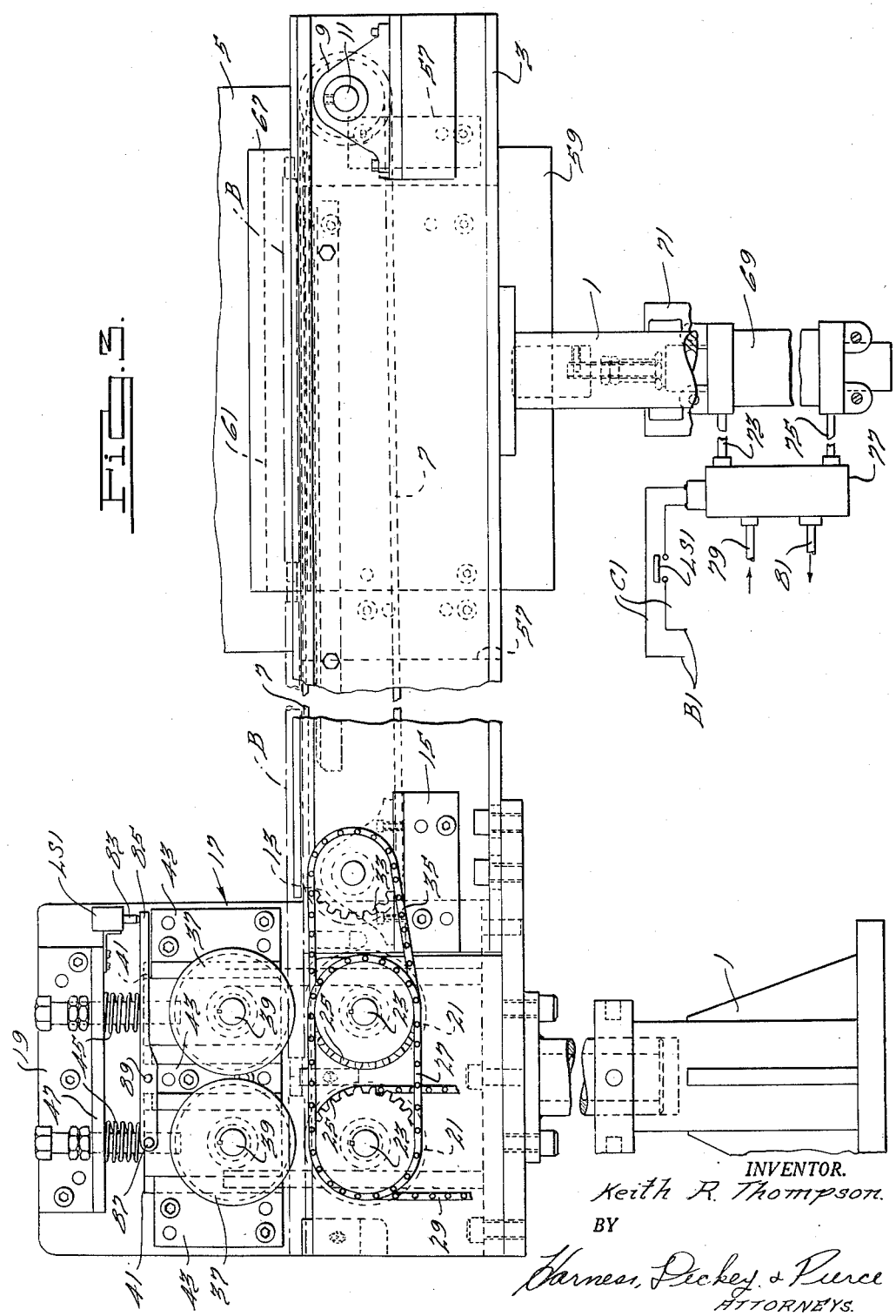

Patented July 29, 1952

2,604,737

UNITED STATES PATENT OFFICE 2,604,737

ROD FEEDING MECHANISM

Keith R. Thompson, Monroe, Mich., assignor to Monroe Auto Equipment Company, Monroe, Mich., a corporation of Michigan Application May 4, 1949, Serial No. 91,390

4 Claims. (Cl. 51—215)

This invention relates to automatic feeding devices for use in mass production operations, it being the particular object of the invention to provide automatic apparatus for transferring elongated rods from a conveyor belt to a desired machine such as a centerless grinder.

In order to accomplish this and other objects, the invention provides an inclined hopper or chute for holding a plurality of rods in sidewise juxtaposition, the rods being fed to the chute from the conveyor by suitable baffle means. Feed rollers are employed to guide the rods axially into the desired machine and the rods are moved from the chute to the rollers by an endless belt. The rods are transferred from the chute to the belt by a pressure actuated elevator mechanism. As a further object of the invention is to feed the rods to the machine in accordance with its demand, the pressure actuated elevator is arranged so that it is under the control of the feed rolls. In this arrangement it is actuated to transfer a rod from the chute to the belt whenever the feed rolls guide a rod to the machine.

A preferred embodiment of the invention is shown by way of illustration in the accompanying drawings in which:

Fig. 3 is a front elevation of the device as shown in Fig. 1, with parts removed and the control circuit for the pressure actuated elevator shown diagrammatically.

Figure 1:
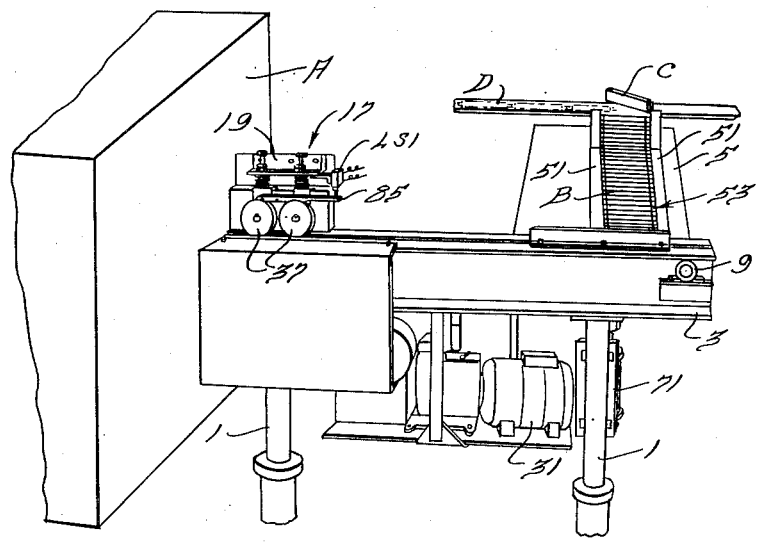
Figure 1 is a perspective view of the rod feeding device of this invention.

The machine has a suitable frame structure that includes legs 1 for supporting the spaced channel beams 3 and a plate 5 that extends laterally and upwardly from one end of the structure provided by beams 3. An endless belt 7 is mounted between the beams 3 on an idler drum 9 that rotates on suitable bearings 11 carried by the chute ends of the beams 3. The belt 7 is driven by the pulley 13 which is supported in suitable bearing brackets 15 at the other end of the beams 3. A feed roll mechanism 17 is supported on legs 1 adjacent the drive pulley end of the beams 3 and includes two pairs of feed rolls that are in alignment with the belt 7 so as to be capable of receiving rods therefrom. It will be understood that the feed roll mechanism is also aligned with the inlet of the desired machine shown generally at A.

The feed roll mechanism 17 includes a mounting plate or frame 19 of any suitable type. The lower rolls 21 of the two pairs of feed rolls are keyed to shafts 23 that are rotatably carried by the plate 19. These shafts also carry drive sprockets 25 that are interconnected by a chain 27, one shaft being drivably connected by chain 29 to the motor 31 which is suitably supported beneath the beams 3. One of the shafts 23 may also be employed to furnish power for the drive pulley sprocket 33 of the endless belt 7 through the medium of chain 35. This connection is preferably made so that the belt moves at a faster rate than the feed rolls thereby causing rods on the belt 7 to be in continuous axial abutment.

While the lower rolls 21 are mounted to rotate about fixed axes, the upper rolls 37 are keyed to shafts 39 that are rotatably carried by the slides 41. The slides 41 are capable of vertical movement in ways provided by the bearing plates 43 which are bolted to mounting plate 19. Each of the slides is yieldably biased downwardly by compression springs 45 inserted between the upper ends of the slides and a spring retainer bracket 47 that is bolted to the plate 19. When a rod passes through the rolls 21 and 37, the slides 41 rise upwardly against the resistance of the springs 45.

The inclined plate 5 has longitudinally spaced side rails 51 thereon which define a chute or hopper 53 for the rods B. The rods may be placed in the chute 53 manually or by the other suitable means, a baffle plate C being shown in Fig. 1 to deflect rods B from a conveyor D. In any case, the rods B lie in sidewise juxtaposition in the chute 53 and are urged downwardly by the force of gravity toward the belt 7.

Figure 2:
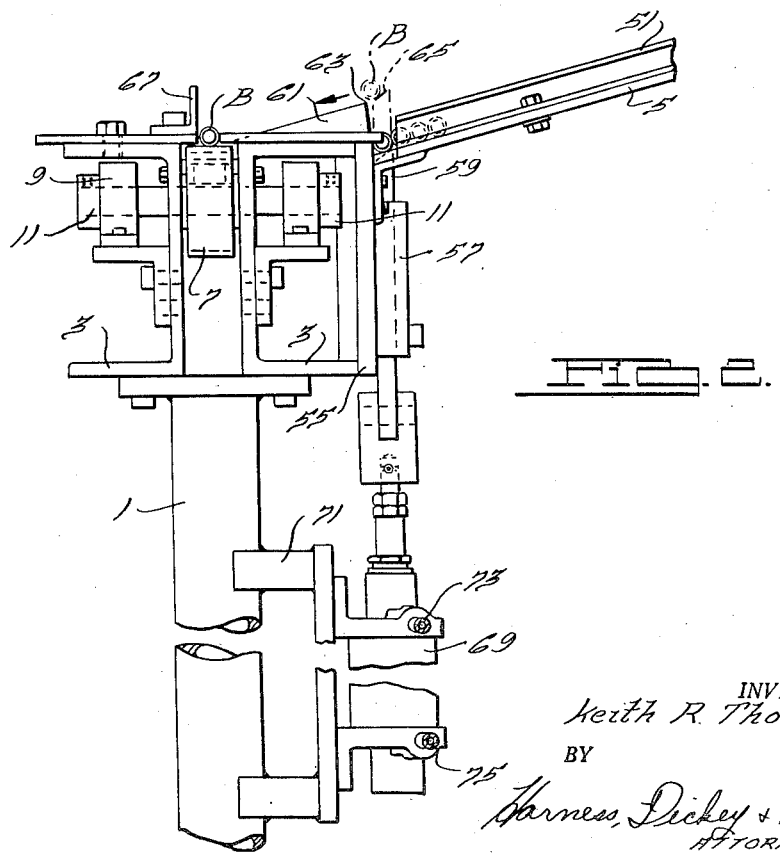
Fig. 2 is a side elevation taken on the right of Fig. 1.

In the embodiment illustrated, the rods B are transferred one at a time from the chute 53 to the belt 7. For this purpose, the side of one of the beams 3 has a bearing plate 55 and longitudinally spaced way providing brackets 57. An elevator plate 59 is slidable on the plate 55 in the ways of brackets 57 and, as shown in Fig. 2, forms a movable stop at the bottom of the chute 53. An inclined ramp 61 is mounted in the top surface of the chute side beam 3 and in juxtaposition to the plate 59. The chute edge 63 of the ramp is well above the bottom of the chute but its other end is in juxtaposition to the belt 7 so that the rods lifted by the plate 59 onto it will roll sideways downwardly onto the belt. The top edges 65 of the plate 59 is beveled so that it and the chute side of the ramp 61 form a movable notch for holding the rods, the notch terminating, of course, at the top edge 63 of the ramp.

It will be recognized from the foregoing that whenever the plate 59 is moved upwardly, a rod is picked up from chute 53 by the top edge 65 of the plate and carried to a point above the ramp 61 where gravity causes it to roll from the edge 65 onto the ramp and thence onto the belt, a stop plate 67 being provided on the opposite beam 3 to prevent the rods from overrolling the belt. The rate at which rods are transferred to the belt 7 should not exceed the rate at which rods are removed from the belt by the feed roll mechanism 17. To synchronize the deposition and withdrawal of rods on and from the belt 7, vertical translation of a roll slide 41 is utilized to control vertical movement of the plate 59. Thus the plate is moved by a pressure cylinder 69 that is secured by bracket 71 to one of the legs 1. The cylinder 69 has conduits 73 and 75 at opposite ends, these being arranged so that when conduit 75 is connected to pressure and conduit 73 to exhaust, the ram of the cylinder 69 and thus the plate 59 will be moved upwardly to transfer a rod from the chute to the belt 7. These conduits are under the control of a four-way, solenoid-operated valve 77 which preferably is spring-biased to provide this connection so that the plate is normally in raised position. The solenoid of the valve 77 is connected through lines C1 to the bus lines B1, one of these lines containing the normally open limit switch LS1. It will be evident that when this switch is closed, the solenoid valve 77 will be energized to actuate cylinder 69 to lower the plate 59 so that it can pick up a rod from chute 53.

The limit switch LS1 is mounted on the plate 19 adjacent the upper slidable feed rolls 41. It has a stem 83 that is operatively engaged by one end of the actuator 85. The other end of the actuator is pivoted at 87 to the distal slide 41 and an intermediate point has a fixed pivot 89. Thus when the slide 41 is moved upwardly by the passage of a rod B through the feedroll mechanism 17, the actuator 85 will allow the spring-pressed stem 83 of the switch LS1 to expand and close the switch thereby energizing solenoid 77 to lower the plate 59 and pick up a rod. When the rod has passed through the roll mechanism 17, the slide 41 will be forced down by the spring 47 thereby raising the inner end of the actuator 85 to open the switch LS1, connect line 75 to pressure line 79, and therefore raise the plate 59 to transfer a rod to the belt 7.

It will be apparent to those in the art that modifications may be made in the foregoing structure without departing from the spirit and scope of the invention.

What is claimed is:

1. In a rod feeding mechanism, the combination of a hopper for the rods, a pair of feed rolls for guiding the rods, said rolls lying in substantially the same plane and having axes spaced apart by a distance approximately equal to the sum of the radii of the rolls and the width of a rod whereby the peripheries of the rolls coact to define a mouth to receive the rods, one of said rolls being slidable upon passage of a rod through the mouth defined by the rolls, means for transferring rods from the hopper to the rolls, and switch means actuated by translation of said slidable roll for actuating said means.

2. A rod feeding device comprising an inclined feed chute for holding rods in sidewise juxtaposition, a conveyor adjacent the lower end of the chute and substantially parallel to rods therein whereby said conveyor is capable of moving the rods axially, means including a slidable plate between the lower end of the chute and the conveyor for transferring rods from the chute to the conveyor, pressure actuated means for sliding said plate, a pair of feed rolls having adjacent peripheries coacting to define an aperture for receiving rods from the conveyor and delivering them to a desired destination, one of said rolls being translatable upon passage of a rod through the aperture and rolls, and switch means actuated by translation of said roll for actuating the pressure actuated means.

3. A rod feeding device comprising, in combination, an endless belt, a pair of feed rolls at the terminal end of the belt adapted to receive rods therefrom, a movable slide, one of said rolls being rotatably mounted on the slide, a spring urging said slide and roll toward the other roll, means for driving the belt and one of said rolls, a chute extending laterally and upwardly from the belt adapted to carry rods in sidewise juxtaposition so that they are substantially parallel to the belt, an inclined ramp between the belt and chute having its chute side above the lower end of the chute but laterally spaced therefrom, a slidable plate between ramp and chute for transferring rods from the chute to the ramp, said plate having a beveled rod engaging edge, said edge and the chute side of said ramp defining a movable rod carrying notch terminating at the top edge of the ramp whereby rods carried therein roll sideways by gravity down the inclined chute onto the belt, pressure actuated means for moving the plate, means biasing said plate to a position adjacent the top of the ramp, switch means for actuating the pressure actuated means to lower the plate, and means whereby movement of the slide as a rod passes through the rolls actuates said switch means.

4. The invention as claimed in claim 3 wherein said belt is moved at a faster rate than said rolls whereby rods therein are in continuous axial abutment.

KEITH R. THOMPSON.

REFERENCES CITED

The following references are of record in the file of this patent:

UNITED STATES PATENTS

| Number | Name | Date |
|---|---|---|
| 132,519 | Braun | Oct. 29, 1872 |
| 1,804,422 | Koch | May 12, 1931 |
| 1,878,820 | Danly | Sept. 20, 1932 |
| 2,210,531 | Engelbaugh et al. | Aug. 6, 1940 |